(12) United States Patent
Barreto et al.

(10) Patent No.: US 9,900,555 B1
(45) Date of Patent: Feb. 20, 2018

(54) VRT: VIRTUAL ROUND TABLE

(71) Applicants: Armando Barreto, Miami, FL (US);
Naphtali Rishe, Miami, FL (US);
Francisco Ortega, Miami, FL (US);
Nonnarit O-larnnithipong, Miami, FL (US)

(72) Inventors: Armando Barreto, Miami, FL (US);
Naphtali Rishe, Miami, FL (US);
Francisco Ortega, Miami, FL (US);
Nonnarit O-larnnithipong, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 15/634,560

(22) Filed: Jun. 27, 2017

(51) Int. Cl.
*H04N 7/14* (2006.01)
*H04N 7/15* (2006.01)
*H04S 7/00* (2006.01)

(52) U.S. Cl.
CPC ............. *H04N 7/157* (2013.01); *H04S 7/302* (2013.01); *H04S 2420/01* (2013.01)

(58) Field of Classification Search
None
See application file for complete search history.

(56) References Cited

U.S. PATENT DOCUMENTS

| | | | |
|---|---|---|---|
| 6,285,392 B1* | 9/2001 | Satoda | H04N 7/142 348/14.08 |
| 7,023,454 B1* | 4/2006 | Knight | G06T 3/0093 345/473 |
| 9,087,403 B2* | 7/2015 | Keating | G06T 19/006 |
| 2010/0316232 A1* | 12/2010 | Acero | H04M 3/568 381/92 |

OTHER PUBLICATIONS

Seitz et al., "View Morphing," Proceedings of the 23rd Annual Conference on Computer Graphics and Interactive Techniques, Aug. 4-9, 1996, pp. 1-10.

* cited by examiner

*Primary Examiner* — Maria El-Zoobi
(74) *Attorney, Agent, or Firm* — Saliwanchik, Lloyd & Eisenschenk (57) ABSTRACT

Systems and methods for virtual collaboration between participants in remote locations are provided. A system can include a computing device, a display, a plurality of cameras, a microphone, at least one speaker or headset, a sensor, and a computer-readable medium having software stored thereon for generating a virtual roundtable experience for the user.

18 Claims, 3 Drawing Sheets

VRT: VIRTUAL ROUND TABLE

STATEMENT OF GOVERNMENT SUPPORT

This invention was made with government support under Grant No. 1338922, Grant No. 1213026, Grant No. 1429345, and Grant No. 1532061, all awarded by the National Science Foundation. The government has certain rights in the invention.

BACKGROUND

Video conference calling allows individuals in remote locations to interact and conduct business via electronic communication. Through video conference calling, businesses can eliminate travel costs and increase efficiency by meeting employees and customers in a virtual environment. However, current video conferencing techniques require dedicated physical space, and installation of purpose-specific and/or permanent video conferencing equipment.

BRIEF SUMMARY

Embodiments of the subject invention provide systems, methods, and apparatuses for virtual collaboration between geographically separated participants. A virtual roundtable (VRT) can be deployed at a standard work station, and users can transmit and receive a video stream and an audio stream without the necessity of costly technology upgrades. Image morphing techniques and head related transferred functions (HRTFs) can be used to deliver spatialized video and audio streams that provide immersive collaboration for multiple participants (e.g., up to six participants). VRT is a video conferencing tool, which eliminates building and maintenance expenses and provides a dynamic tool for virtual collaboration.

In an embodiment, six users in six different remote locations can participate in a virtual meeting from their individual workstations. The VRT can retrieve video streams from three cameras and display the images on three display monitors, the overall effect being each participant can view the other five participants seated in individually seated and/or evenly spaced apart positions on table (e.g., a hexagonal table). The VRT can also retrieve audio streams from each participant and separate the audio stream into a left audio stream and a right audio stream to create an immersive feeling of participation in a face-to-face conversation.

In another embodiment, a VRT can accommodate a group meeting of three, four, or five participants. In the event three users are participating, the users can be displayed seated at a triangular table. Additionally, if four or five users are participating, they can be displayed on a rectangular shape or pentagonal table, respectively. The VRT can separate the users from their respective backgrounds and display a uniform professional office background to create the impression of collaboration by all participants in a single room. In addition to providing morphed images of users and professional office backgrounds, the VRT can provide a virtual background to display graphs, charts, images, and/or other useful items for the virtual meeting.

DETAILED DESCRIPTION

Embodiments of the subject invention provide novel and advantageous systems, methods, and apparatuses for conducting a virtual conference through electronic visual and audio media. Rather than dedicate office space and equipment to conference rooms, the virtual roundtable (VRT) allows users to participate in meetings at their own workstation using equipment already in use at the workstation (e.g., a computing device (e.g., a personal computer), one or more displays (e.g., monitors), one or more image capturing devices (e.g., cameras), one or more audio capturing devices (e.g., microphones), and/or a headset). Through VRT software, visual image data retrieved from image capturing devices can be configured to provide dynamic spatialization, contributing significantly to an enhanced sense of immersion into a meeting. Audio stream data recovered from headsets can be configured to direct audio signals from distinct virtual locations to create the impression of a real discussion.

Figure 1:
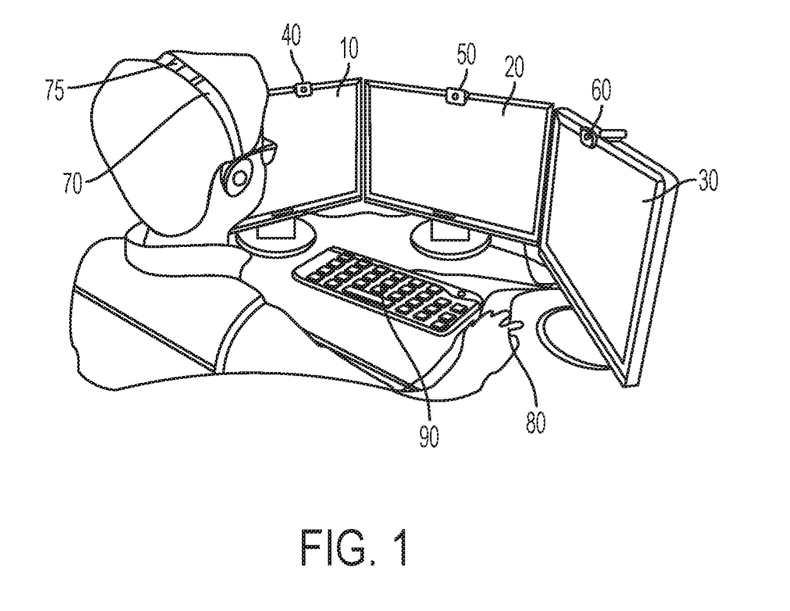
FIG. 1 shows an image of a possible VRT setup according to an embodiment of the subject invention.

FIG. 1 shows an image of a VRT set up 100 at a workstation of an employee, according to an embodiment of the subject invention. Referring to FIG. 1, a participant can have one or more of a left side display 10, a left side camera 40, a center display 20, a center camera 50, a right side display 30, a right side camera 60, a headset 70, a microelectromechanical system (MEMS) magnetic angular rate and gravity (MARG) sensor 75, a computer, a mouse 80, and a keyboard 90. A camera can include, but is not necessarily limited to, an external camera, a built-in camera, a red green blue (RGB) camera, or an infrared time-of-flight camera.

A workstation configured for a user of the VRT, according to an embodiment of the subject invention, is depicted in FIG. 1. The computer can be connected to high speed internet. The left display 10, center display 20, right display 30, left camera 40, center camera 50, and right camera 60 can each be connected to a single connection box, which is connected to the computer. In another embodiment, each monitor is connected to the computer (e.g., via an individual video cable to an individual video port, respectively, on the computer), and each camera is connected (e.g., via an individual HDMI cable to an individual HDMI port, respectively, on the computer) to the computer. The left display 10, center display 20, and right display 30 can each be, for example, an LCD flat screen, though embodiments are not limited thereto. In a specific embodiment, each display has a 24" dimension. The computer can be connected to the headset (e.g., through a standard 8" cable or wirelessly, for example, through Bluetooth technology). The headset 70 can have a left speaker connected to a right speaker by a band and/or a microphone. The microphone can be, for example, a boom microphone. A MEMS MARG sensor 75, also known as an inertial measurement unit (IMU), coupled with a magnetometer, can be connected to the headset 70 band. The MARG sensor 75 can detect acceleration, angular rate of rotation, and magnetic field strength in three orthogonal directions. The MEMS MARG sensor can be connected to the computer (e.g., via a USB cable connected to a USB port on the computer or via a wireless method).

Figure 2:
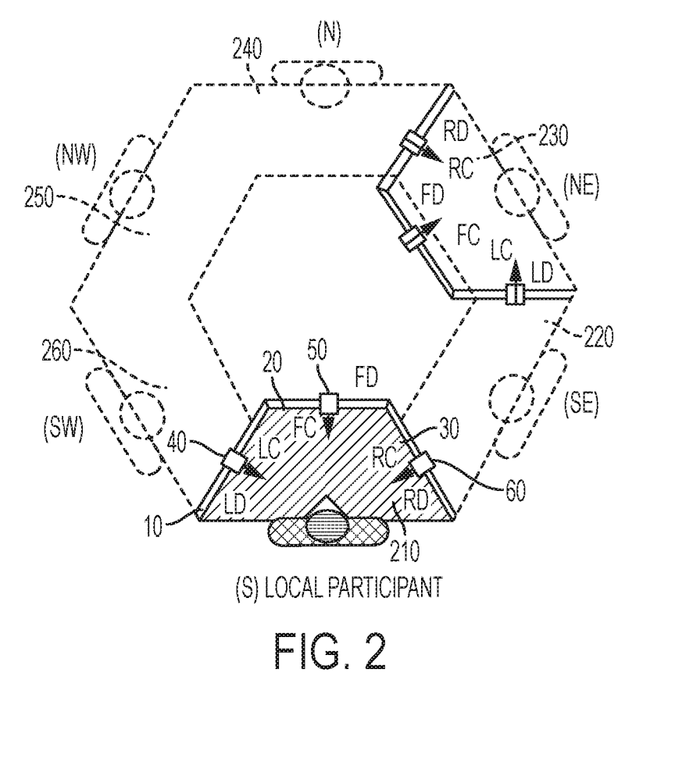
FIG. 2 shows a schematic view of a virtual hexagonal table within a virtual conference room according to an embodiment of the subject invention.
Figure 3:
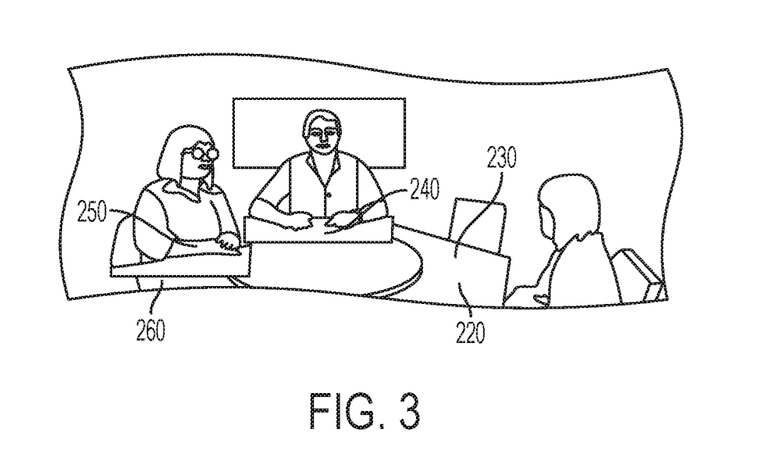
FIG. 3 shows a representation of the viewpoint of a participant, who is seated at the VRT with two other participants, according to an embodiment of the subject invention.

FIG. 2 shows a schematic view of a hexagonal VRT 200 within a virtual conference room, according to an embodiment of the subject invention. A hexagonal VRT can be subdivided into six possible distinct sections: a virtual South (S) location 210, a virtual Southeast (SE) location 220, a virtual Northeast (NE) location 230, a virtual North (N) location 240, a virtual Northwest (NW) location 250, and a virtual Southwest (SW) location 260. FIG. 3 shows an image of a possible viewpoint of a participant in the S location 210 collaborating with participants in the NW location 250, N location 240, and SE location 220. Although FIG. 2 displays a hexagonal VRT, the VRT can be in the form of a plurality of shapes, including but not limited to a triangle, rectangle, pentagon, or hexagon.

The VRT generates images of the participants, using image capturing devices (e.g., three cameras for each participant), to create the visual impression of sitting at a physical conference table with the other participants. The VRT displays images on one or more displays (e.g., three monitors for each participant), creating the perception of a spatially and directionally accurate in-person meeting. For example, at a hexagonal VRT the image of a participant in the N location 240 can be retrieved by the center camera 50 of the participant in the N location 240, scaled down, superimposed on a virtual background image, and displayed on the center display 20 of a participant in the S location 210. Additionally, images of a participant sitting in the NW location 250 can be retrieved from the center camera 50 and right camera 30 of the participant in the NW location 250, transmitted to the participant in the S location 210. Images of a participant in the SE location 220 can be retrieved from the center camera 50 and the left camera 40 of the participant in the SE location 220 and transmitted to a participant in the south location 210. One of ordinary skill in the art should appreciate that multiple morphing techniques exist and can be employed; for example, the VRT can use a "view morphing" technique to combine image data retrieved from multiple cameras.

Figure 4:
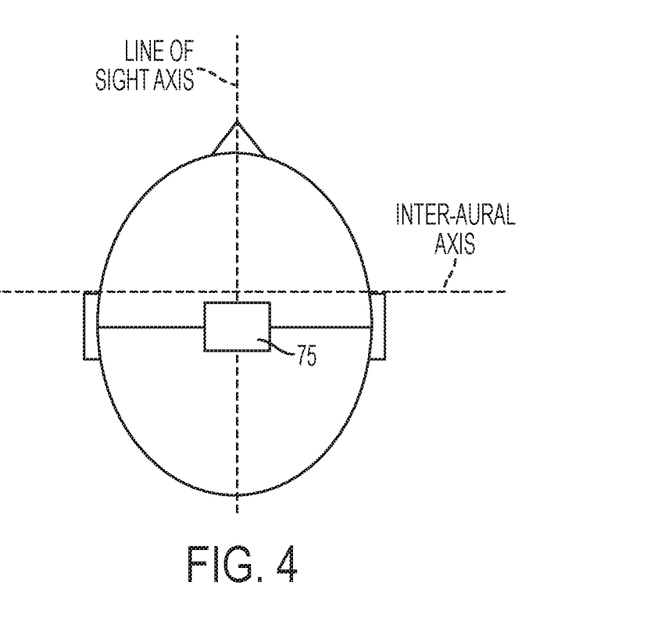
FIG. 4 shows a bird's eye view of a participant, indicating the line of sight axis and inter-aural axis, according to an embodiment of the subject invention.

In order to create realistic audio directionality, head related transfer functions (HRTFs) can be applied locally to the monaural audio streams coming from each participant's audio capturing device (e.g., microphone). Each audio stream can be identified, and an appropriate left and right pair of HRTFs can be applied to associate the source of the stream with the correct virtual position at the VRT. In embodiments of the subject invention, each local station of the VRT system can receive a remote audio stream from each user. The VRT system can locally create a virtually spatialized left audio stream (left channel) and a virtually spatialized right audio stream (right channel). The VRT system can sum the virtually spatialized remote left audio streams to create an aggregate left audio stream and sum the virtually spatially right audio streams to create an aggregate right audio stream. The VRT can deliver the aggregate left and right audio streams to the corresponding left or right headphone of a user. Initially, the locations of the left and right ears of the subject participant are assumed to be perpendicular to the line of sight or an azimuth of 0° degrees. In other words, the initial head orientation of a participant is assumed to directly face his or her center camera 50. The IMU 75, if present, can continuously monitor the three dimensional (3-D) orientation of the head of the subject participant. A change in the subject participant's 3-D interaural axis can change the pair of HRTFs applied to the participant. For example, if the subject participant in the S location 210 turns his or her head 90° degrees to the left (from the initial position), the HRTFs can change from placing the sound in front of the subject participant to placing the sound to the right of the subject participant.

This dynamic adjustment of the sound spatialization effect for all the audio streams coming from the virtual participants increases the accuracy and realism of the VRT. Additionally, this dynamic spatialization enhances the intelligibility of multiple conversations (i.e., the cocktail party effect) and the sense of immersion into the virtual meeting.

In order to enhance the realistic effect of the VRT, a plurality of images (e.g., of professional offices) can be pre-recorded and stored to create virtual backgrounds for the VRT. The VRT can retrieve an image of a participating location, separate the image of the participant from the background, and place the image of the participant behind a table and in front of a virtual background image. The image of the table can be configured such that its shape corresponds with the number of participants. For example, three participants can sit at a triangular table, four participants can sit at rectangular table, and five participants can sit at a pentagonal table, though embodiments are not limited thereto (for example, it is possible for empty positions to be present (e.g., if three participants are at a rectangular, pentagonal, or hexagonal table)). The default shape of the table can be hexagonal, and such a table can be used by up to six participants. The backgrounds can comprise, for example, static images of professional office setting backgrounds, in which a common background theme is presented to all participants. In one embodiment, the virtual background can include six views from a virtual conference room. In another embodiment, the virtual background can be generated through high resolution digital photography of a real conference room. In another embodiment, the virtual backgrounds can be coordinated video sequences taken simultaneously from six viewpoints.

Each participant can have VRT software stored on, or in operable communication with, the computing device used for the virtual conference. VRT software contains two main program modules: (1) the first module generates and transmits video (e.g., three video streams, retrieved from the left camera 40, center camera 50, and right camera 60), from which the background has been removed and audio (e.g., one audio stream retrieved from the user's microphone); and (2) the second module processes the data from the video and audio (e.g., three video streams and one audio stream), displays an image of the VRT to a user's display(s) (e.g., three display screens) and generates audio (e.g., a left audio channel and a right audio channel to deliver to a user's headset 70).

In an embodiment, the first program module retrieves images from the left camera 40, the center camera 50, and the right camera 60, which can be red-green-blue (RGB) webcams. The user is asked to stand still, for example for a period of time of at least 5 seconds (e.g., for a period of time of 5 seconds), to complete the first phase of initialization of the VRT system. This first phase defines the initial pixel state for each camera's field of view. The user is then asked to slowly rock his or her head in a left direction, a right direction, a back direction, and a forward direction. During this second phase, pixels, whose characteristics change at the beginning of the second phase, are identified to define the contour of the body and head. The VRT software analyzes the color continuity of the pixels to assist in identifying the contour of the user. After the pixels are identified, the contour can be tracked on a frame by frame basis. Pixels that are located outside of the contour can be identified and classified as background pixels. These background pixels can be replaced with a virtual background.

In another embodiment, the left camera 40, the center camera 50, and the right camera 60 are red green blue/infrared time of flight (RGB/IR ToF) cameras. The infrared time of flight sensor can measure the time of flight of light between the object and the image sensor. This can enhance the image by providing data coordinates for the depth and can result in a more robust contour detection. The second program module can retrieve the audio and visual streams of each participant, process the data, and display the image on each user's display(s).

The following discussion (in this paragraph) is for exemplary purposes only and is based on six users participating in a hexagonal VRT. From the view of the participant in the S location 210, the images of the participants in the SE location 220 and NE location 230 are retrieved from their respective center camera 50 and right cameras 60, morphed to create properly oriented images, scaled to emulate proper distance (for example, from the view of the participant in S location 210, the morphed image of the participant in the NE location 230 will be reduced by more than the morphed image of the participant in the SE location 220), and superimposed upon the appropriate background The images from the participants in the NE location 230 and SE location 220 can be processed and displayed on the S location 210 displays with a visual and aural impression that the participants are correctly spatially located with respect to each location.

As described above, and seen in FIG. 2, the VRT can be hexagonal in shape, according to an embodiment of the subject invention. As such, the visual and aural spatial impressions received by the participant could be interchanged with a participant in any other position. In other words, from the view of the participant in the SW location 260, the images of the participants in the NW location 250 and N location 240 are retrieved from their respective center camera 50 and left camera 40, morphed to create properly oriented images, scaled to emulate proper distance (for example, from the view of the local participant, the morphed image of the participant in the N location 240 will be reduced by more than the morphed image of the participant in the NW location 260), and superimposed upon the appropriate background.

In addition to displaying a video stream of a user, background, and table, the VRT can display a virtual whiteboard on at least one display of at least one user. The right to control the virtual whiteboard is designated on a first come, first serve basis and may be acquired when the previous user relinquishes control of the virtual whiteboard.

In order to create the impression of correct spatial orientation of audio, the VRT can obtain orientation of the line-of-sight axis (the line-of-sight axis is a line from the back of the participant's head to the front of the head and is perpendicular to the inter-aural axis) using signals provided by the IMU 75. The VRT can further continuously update the orientation of the line-of-sight axis and inter-aural axis in real time. Using the real time line-of-sight orientation data, the "corrected" azimuth and elevation can be determined for each of the other participants with respect to the current instantaneous line-of-sight orientation of the head of the subject participant. For each of the other remote participants, the VRT can retrieve the broadcasted mono audio signals from each participant and apply a left/right HRTF pair to each of the signals according to the corrected azimuth and elevation of the virtual position of each participant. The VRT can deliver an aggregate left audio signal to the left headphone of a subject participant by adding the left audio signals of the each of the other participants to generate the aggregate left audio signal. Similarly, the VRT can deliver an aggregate right audio signal to the right headphone of a subject participant by adding the right audio signals of the each of the other participants to generate the aggregate right audio signal.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1

A virtual roundtable (VRT) system, comprising:
a computing device in operable with a network connection allowing connection of the computing device to at least one remote computing device;
a display in operable communication with the computing device;
a plurality of image capturing devices in operable communication with the computing device;
an audio output device in operable communication with the computing device;
an angular rate and gravity sensor in operable communication with the computing device;
an audio capturing device in operable communication with the computing device; and
a (non-transitory) computer-readable medium in operable communication with the computing device and comprising computer-executable instructions stored thereon that, when executed by a processor of the computing device, perform the following steps:

retrieving at least two video streams of a first user of the computing device from at least two image capturing devices, respectively, of the plurality of image capturing devices;

generating a morphed and scaled image of the first user from the video streams;

transmitting a uniform video stream of the morphed and scaled image via the network connection to be displayed to a second user of a first remote computing device;

retrieving an audio stream from the audio capturing device;

generating spatialized left and right audio streams from the audio stream received from each remote participant; and transmitting the audio stream to the second user of the first remote computing device.

Embodiment 2

The system according to embodiment 1, wherein the computer-executable instructions stored on the computer-readable, when executed by the processor, further performs the following steps:

receiving a remote audio stream from each of at least two other users of the system;

creating aggregate left and right audio streams by summing the virtually spatialized remote audio stream of each user; and providing the aggregate left audio stream and the aggregate right audio stream to the audio output device.

Embodiment 3

The system according to any of embodiments 1-2, wherein the computer-executable instructions stored on the computer-readable, when executed by the processor, further performs the following step: removing the background from the image of the first user in the at least two video streams.

Embodiment 4

The system according to any of embodiments 1-3, wherein the computer-executable instructions stored on the computer-readable, when executed by the processor, further performs the following steps:

defining an initial pixel state for each a field of view of each image capturing device;

defining a contour of a body and a head of the first user;

tracking the contour on a frame by frame basis;

identifying a pixel that is located outside of the contour of the body and the head of the first user;

classifying the pixel located outside the contour of the body and the head as a background pixel; and replacing the background pixel with a background image.

Embodiment 5

The system according to any of embodiments 1-4, wherein the computer-executable instructions stored on the computer-readable, when executed by the processor, further performs the following steps:

superimposing the image of the first user onto a pre-stored background image to create an updated image of the first user; and superimposing a pre-stored image of a table onto the updated image of the first user.

Embodiment 6

The system according to embodiment 5, wherein the computing device is connected to two remote computing devices via the network connection, and wherein the pre-stored image of a table is an image of a single, scaled, spatially accurate, triangular table, in which an image of the second user of the first remote computing device is displayed to the first user as sitting at the triangular table and an image of a third user of a second remote computing device is displayed to the first user as sitting at the triangular table.

Embodiment 7

The system according to embodiment 5, wherein the computing device is connected to three remote computing devices via the network connection, and wherein the pre-stored image of a table is an image of a single, scaled, spatially accurate, rectangular table, in which an image of the second user of the first remote computing device is displayed to the first user as sitting at the rectangular table, an image of a third user of a second remote computing device is displayed to the first user as sitting at the rectangular table, and an image of a fourth user of a third remote computing device is displayed to the first user as sitting at the rectangular table.

Embodiment 8

The system according to embodiment 5, wherein the computing device is connected to four remote computing devices via the network connection, and wherein the pre-stored image of a table is an image of a single, scaled, spatially accurate, pentagonal table, in which an image of the second user of the first remote computing device is displayed to the first user as sitting at the pentagonal table, an image of a third user of a second remote computing device is displayed to the first user as sitting at the pentagonal table, an image of a fourth user of a third remote computing device is displayed to the first user as sitting at the pentagonal table, and an image of a fifth user of a fourth remote computing device is displayed to the first user as sitting at the pentagonal table.

Embodiment 9

The system according to embodiment 5, wherein the computing device is connected to five remote computing devices via the network connection, and wherein the pre-stored image of a table is an image of a single, scaled, spatially accurate, hexagonal table, in which an image of the second user of the first remote computing device is displayed to the first user as sitting at the hexagonal table, an image of a third user of a second remote computing device is displayed to the first user as sitting at the hexagonal table, an image of a fourth user of a third remote computing device is displayed to the first user as sitting at the hexagonal table, an image of a fifth user of a fourth remote computing device is displayed to the first user as sitting at the hexagonal table, and an image of a sixth user of a fifth remote computing device is displayed to the first user as sitting at the hexagonal table.

Embodiment 10

The system according to any of embodiments 1-9, wherein the computer-executable instructions stored on the computer-readable, when executed by the processor, further performs the following step: continuously applying head related transfer functions (HRTFs) to the audio stream in order to produce a spatially accurate left audio stream and right audio stream.

Embodiment 11

The system according to any of embodiments 1-10, wherein the computer-executable instructions stored on the computer-readable, when executed by the processor, further performs the following step: displaying a virtual whiteboard on the display for use by the first user.

Embodiment 12

The system according to any of embodiments 1-11, wherein the plurality of image capturing devices comprises three cameras,
wherein the audio output device comprises a stereo headset with a left speaker and a right speaker,
wherein the audio capturing device comprises a microphone,
wherein the display comprises three monitors, and
wherein the retrieving of the at least two video streams of the first user of the computing device comprises retrieving three video streams from the three cameras, respectively.

Embodiment 13

The system according to any of embodiments 1-12, wherein the angular rate and gravity sensor is a microelectromechanical system (MEMS) magnetic angular rate and gravity (MARG) sensor.

Embodiment 14

The system according to embodiment 13, wherein the audio output device comprises a stereo headset with a left speaker and a right speaker, and wherein the MEMS MARG sensor is connected to the stereo headset.

Embodiment 15

A method of performing a conference call using a virtual roundtable (VRT) system (e.g., the virtual system according to any of embodiments 1-14), the method comprising:
capturing, by a plurality of image capturing devices of the VRT system, a plurality of video streams of a first user of the VRT system;
generating, by a processor, a morphed and scaled image of the first user from the plurality of video streams;
transmitting a uniform video stream of the morphed and scaled image, via a network connection in operable communication with the VRT system, to be displayed to a second user of a first remote computing device;
capturing, by an audio capturing device of the VRT system, an audio stream;
separating the audio stream into a left audio stream and right audio stream;
transmitting the audio stream, via the network connection, to be provided to the second user of the first remote computing device;
receiving, via the network connection, a remote uniform video stream;
receiving, via the network connection, a remote audio stream;
displaying, by a display of the VRT system, the remote uniform video stream; and
outputting, by an audio outputting device of the VRT system, the remote audio stream.

Embodiment 16

The method according to embodiment 15, wherein the receiving of the remote audio stream comprises receiving a remote left audio stream from each of at least two other users of the VRT system,
wherein the method further comprises creating an aggregate left audio stream by summing the virtually spatialized remote left audio streams of each user and creating an aggregate right audio stream by summing the remote virtually spatialized right audio streams of each user,
wherein the outputting of the remote audio stream comprises outputting, by the audio outputting device, the aggregate left audio stream and the aggregate right audio stream,
wherein the method further comprises removing the background from the image of the first user in the plurality of video streams, and
wherein the method further comprises continuously applying, by the processor, head related transfer functions (HRTFs) to the audio stream in order to produce a spatially accurate left audio stream and right audio stream.

Embodiment 17

The method according to any of embodiments 15-16, further comprising:
defining, by the processor, an initial pixel state for each a field of view of each image capturing device;
defining, by the processor, a contour of a body and a head of the first user;
tracking, by the processor, the contour on a frame by frame basis;
identifying, by the processor, a pixel that is located outside of the contour of the body and the head of the first user;
classifying, by the processor, the pixel located outside the contour of the body and the head as a background pixel;
replacing, by the processor, the background pixel with a background image by superimposing the image of the first user onto a pre-stored background image to create an updated image of the first user; and
superimposing, by the processor, a pre-stored image of a table onto the updated image of the first user.

Embodiment 18

The method according to embodiment 17, wherein the pre-stored image of a table being an image of a single, scaled, spatially accurate, hexagonal table, in which an image of the second user of the first remote computing device is displayed to the first user as sitting at the hexagonal table, an image of a third user of a second remote computing device is displayed to the first user as sitting at the hexagonal table, an image of a fourth user of a third remote computing device is displayed to the first user as sitting at the hexagonal table, an image of a fifth user of a fourth remote computing device is displayed to the first user as sitting at the hexagonal table, and an image of a sixth user of a fifth remote computing device is displayed to the first user as sitting at the hexagonal table.

Embodiment 19

The method according to any of embodiments 15-18, wherein the plurality of image capturing devices comprises three cameras, wherein the audio output device comprises a stereo headset with a left speaker and a right speaker, wherein the audio capturing device comprises a microphone, wherein the display comprises three monitors, wherein the capturing of a plurality of video streams of the first user comprises capturing three video streams from the three cameras, respectively, wherein the angular rate and gravity sensor is a microelectromechanical system (MEMS) magnetic angular rate and gravity (MARG) sensor, and wherein the MEMS MARG sensor is connected to the stereo headset.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

Seitz, Steven M., and Charles R. Dyer. "View Morphing." Proceedings of the 23rd Annual Conference on Computer Graphics and Interactive Techniques—SIGGRAPH '96 (1996).

What is claimed is:

1. A virtual roundtable (VRT) system, comprising:
   a computing device in operable with a network connection allowing connection of the computing device to at least one remote computing device;
   a display in operable communication with the computing device;
   a plurality of image capturing devices in operable communication with the computing device;
   an audio output device in operable communication with the computing device;
   an angular rate and gravity sensor in operable communication with the computing device;
   an audio capturing device in operable communication with the computing device; and
   a computer-readable medium in operable communication with the computing device and comprising computer-executable instructions stored thereon that, when executed by a processor of the computing device, perform the following steps:
      retrieving at least two video streams of a first user of the computing device from at least two image capturing devices, respectively, of the plurality of image capturing devices;
      generating a morphed and scaled image of the first user from the video streams;
      transmitting a uniform video stream of the morphed and scaled image via the network connection to be displayed to a second user of a first remote computing device;
      retrieving an audio stream from the audio capturing device and separating the audio stream into a virtually spatialized left audio stream and a virtually spatialized right audio stream;
      transmitting the virtually spatialized left audio stream and the virtually spatialized right audio stream to the audio output device of the second user of the first remote computing device;
      receiving a remote audio stream from each of at least two other users of the system;
      creating an aggregate left audio stream by summing the virtually spatialized remote left audio stream of each user;
      creating an aggregate right audio stream by summing the virtually spatialized remote right audio stream of each user; and
      providing the aggregate left audio stream and the aggregate right audio stream to the audio output device.

2. The system according to claim 1, the computer-executable instructions stored on the computer-readable medium, when executed by the processor, further performing the following step: removing the background from the image of the first user in the at least two video streams.

3. The system according to claim 1, the computer-executable instructions stored on the computer-readable medium, when executed by the processor, further performing the following steps:
   defining an initial pixel state for a field of view of each image capturing device;
   defining a contour of a body and a head of the first user;
   tracking the contour on a frame by frame basis;
   identifying a pixel that is located outside of the contour of the body and the head of the first user;
   classifying the pixel located outside the contour of the body and the head as a background pixel; and
   replacing the background pixel with a background image.

4. The system according to claim 3, the computer-executable instructions stored on the computer-readable medium, when executed by the processor, further performing the following steps:
   superimposing the image of the first user onto a pre-stored background image to create an updated image of the first user; and
   superimposing a pre-stored image of a table onto the updated image of the first user.

5. The system according to claim 3, the computing device being connected to two remote computing devices via the network connection, and
   the pre-stored image of a table being an image of a single, scaled, spatially accurate, triangular table, in which an image of the second user of the first remote computing device is displayed to the first user as sitting at the triangular table and an image of a third user of a second remote computing device is displayed to the first user as sitting at the triangular table.

6. The system according to claim 3, the computing device being connected to three remote computing devices via the network connection, and
   the pre-stored image of a table being an image of a single, scaled, spatially accurate, rectangular table, in which an image of the second user of the first remote computing device is displayed to the first user as sitting at the rectangular table, an image of a third user of a second remote computing device is displayed to the first user as sitting at the rectangular table, and an image of a fourth user of a third remote computing device is displayed to the first user as sitting at the rectangular table.

7. The system according to claim 3, the computing device being connected to four remote computing devices via the network connection, and the pre-stored image of a table being an image of a single, scaled, spatially accurate, pentagonal table, in which an image of the second user of the first remote computing device is displayed to the first user as sitting at the pentagonal table, an image of a third user of a second remote computing device is displayed to the first user as sitting at the pentagonal table, an image of a fourth user of a third remote computing device is displayed to the first user as sitting at the pentagonal table, and an image of a fifth user of a fourth remote computing device is displayed to the first user as sitting at the pentagonal table.

8. The system according to claim 3, the computing device being connected to five remote computing devices via the network connection, and the pre-stored image of a table being an image of a single, scaled, spatially accurate, hexagonal table, in which an image of the second user of the first remote computing device is displayed to the first user as sitting at the hexagonal table, an image of a third user of a second remote computing device is displayed to the first user as sitting at the hexagonal table, an image of a fourth user of a third remote computing device is displayed to the first user as sitting at the hexagonal table, an image of a fifth user of a fourth remote computing device is displayed to the first user as sitting at the hexagonal table, and an image of a sixth user of a fifth remote computing device is displayed to the first user as sitting at the hexagonal table.

9. The system according to claim 1, the computer-executable instructions stored on the computer-readable medium, when executed by the processor, further performing the following step: continuously applying head related transfer functions (HRTFs) to the audio stream in order to produce a spatially accurate left audio stream and right audio stream.

10. The system according to claim 1, the computer-executable instructions stored on the computer-readable medium, when executed by the processor, further performing the following step: displaying a virtual whiteboard on the display for use by the first user.

11. The system according to claim 1, the plurality of image capturing devices comprising three cameras, the audio output device comprising a stereo headset with a left speaker and a right speaker, the audio capturing device comprising a microphone, the display comprising three monitors, and the retrieving of the at least two video streams of the first user of the computing device comprising retrieving three video streams from the three cameras, respectively.

12. The system according to claim 1, the angular rate and gravity sensor being a microelectromechanical system (MEMS) magnetic angular rate and gravity (MARG) sensor.

13. The system according to claim 12, the audio output device comprising a stereo headset with a left speaker and a right speaker, and the MEMS MARG sensor being connected to the stereo headset.

14. A method of performing a conference call using a virtual roundtable (VRT) system, the method comprising:

capturing, by a plurality of image capturing devices of the VRT system, a plurality of video streams of a first user of the VRT system;

generating, by a processor, a morphed and scaled image of the first user from the plurality of video streams;

transmitting a uniform video stream of the morphed and scaled image, via a network connection in operable communication with the VRT system, to be displayed to a second user of a first remote computing device;

capturing, by an audio capturing device of the VRT system, an audio stream;

transmitting the audio stream, via the network connection, to be provided to the second user of the first remote computing device;

receiving, via the network connection, a remote uniform video stream;

receiving, via the network connection, a remote audio stream;

using virtual spatialization to generate left and right audio streams for the remote participants;

displaying, by a display of the VRT system, the remote uniform video stream; and outputting, by an audio outputting device of the VRT system, the summed, virtually spatialized left and right remote audio streams, the receiving of the remote audio stream comprising receiving a remote audio stream from each of at least two other users of the VRT system, the method further comprising creating t left audio stream by summing the virtually spatialized remote left audio stream of each user and creating an aggregate right audio stream by summing the virtually spatialized remote right audio stream of each user, the outputting of the remote audio stream comprising outputting, by the audio outputting device, the aggregate left audio stream and the aggregate right audio stream, the method further comprising removing the background from the image of the first user in the plurality of video streams, and the method further comprising continuously applying, by the processor, head related transfer functions (HRTFs) to the audio stream in order to produce a spatially accurate left audio stream and right audio stream.

15. The method according to claim 14, further comprising:

defining, by the processor, an initial pixel state for a field of view of each image capturing device;

defining, by the processor, a contour of a body and a head of the first user;

tracking, by the processor, the contour on a frame by frame basis;

identifying, by the processor, a pixel that is located outside of the contour of the body and the head of the first user;

classifying, by the processor, the pixel located outside the contour of the body and the head as a background pixel;

replacing, by the processor, the background pixel with a background image by superimposing the image of the first user onto a pre-stored background image to create an updated image of the first user; and superimposing, by the processor, a pre-stored image of a table onto the updated image of the first user.

16. The method according to claim 15, the pre-stored image of a table being an image of a single, scaled, spatially accurate, hexagonal table, in which an image of the second user of the first remote computing device is displayed to the first user as sitting at the hexagonal table, an image of a third user of a second remote computing device is displayed to the first user as sitting at the hexagonal table, an image of a fourth user of a third remote computing device is displayed to the first user as sitting at the hexagonal table, an image of a fifth user of a fourth remote computing device is displayed to the first user as sitting at the hexagonal table, and an image of a sixth user of a fifth remote computing device is displayed to the first user as sitting at the hexagonal table.

17. The method according to claim 14, the plurality of image capturing devices comprising three cameras,
the audio output device comprising a stereo headset with a left speaker and a right speaker,
the audio capturing device comprising a microphone,
the display comprising three monitors,
the capturing of a plurality of video streams of the first user comprising capturing three video streams from the three cameras, respectively,
the angular rate and gravity sensor being a microelectromechanical system (MEMS) magnetic angular rate and gravity (MARG) sensor, and
the MEMS MARG sensor being connected to the stereo headset.

18. A virtual roundtable (VRT) system, comprising:
a computing device in operable communication with a network connection allowing connection of the computing device to at least one remote computing device;
a display in operable communication with the computing device and comprising three monitors;
three cameras in operable communication with the computing device;
a stereo headset in operable communication with the computing device and comprising a left speaker and a right speaker;
a microelectromechanical system (MEMS) magnetic angular rate and gravity (MARG) sensor in operable communication with the computing device and connected to the stereo headset;
a microphone in operable communication with the computing device; and
a computer-readable medium in operable communication with the computing device and comprising computer-executable instructions stored thereon that, when executed by a processor of the computing device, perform the following steps:
retrieving three video streams of a first user of the computing device from the three cameras, respectively;
defining an initial pixel state for a field of view of each camera;
defining a contour of a body and a head of the first user;
tracking the contour on a frame by frame basis;
identifying a pixel that is located outside of the contour of the body and the head of the first user;
classifying the pixel located outside the contour of the body and the head as a background pixel;
replacing the background pixel with a pre-stored background image by superimposing the image of the first user onto the pre-stored background image to create an updated image of the first user;
superimposing a pre-stored image of a table onto the updated image of the first user;
generating a morphed and scaled image of the first user from the three video streams;
transmitting a uniform video stream of the morphed and scaled image with the pre-stored background image and pre-stored image of a table, via the network connection, to be displayed to a second user of a first remote computing device;
retrieving an audio stream from the microphone;
transmitting the audio stream via the network connection to be provided to the second user of the first remote computing device;
receiving a remote audio stream from each of at least two other users of the system;
creating an aggregate left audio stream by summing the virtually spatialized remote left audio stream of each user;
creating an aggregate right audio stream by summing the virtually spatialized remote right audio stream of each user;
outputting the aggregate left audio stream through the left speaker of the stereo headset;
outputting the aggregate right audio stream through the right speaker of the stereo headset; and
displaying a virtual whiteboard on the display for use by the first user,
the computing device being connected to at least two remote computing devices via the network connection, and
the pre-stored image of a table being an image of a single, scaled, spatially accurate, table that is triangular, rectangular, pentagonal, or hexagonal, in which an image of the second user of the first remote computing device is displayed to the first user as sitting at the table and an image of a third user of a second remote computing device is displayed to the first user as sitting at the table.

* * * * *